(12) United States Patent
Won et al.

(10) Patent No.: US 10,915,001 B2
(45) Date of Patent: Feb. 9, 2021

(54) LIGHT DEFLECTOR AND LIGHT OUTPUT DEVICE INCLUDING THE SAME

(71) Applicant: SAMSUNG ELECTRONICS CO., LTD., Suwon-si (KR)

(72) Inventors: Kanghee Won, Seoul (KR); Young Kim, Yongin-si (KR); Byonggwon Song, Seoul (KR); Hoon Song, Yongin-si (KR); Jungkwuen An, Suwon-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/529,328

(22) Filed: Aug. 1, 2019

(65) Prior Publication Data
US 2020/0272023 A1 Aug. 27, 2020

(30) Foreign Application Priority Data

Feb. 25, 2019 (KR) .................... 10-2019-0021953

(51) Int. Cl.
- G02F 1/29 (2006.01)
- G02B 30/00 (2020.01)
- H01C 1/14 (2006.01)
- H01C 1/16 (2006.01)

(52) U.S. Cl.
CPC ............ *G02F 1/29* (2013.01); *G02B 30/00* (2020.01); *G02F 2203/01* (2013.01); *G02F 2203/24* (2013.01); *H01C 1/14* (2013.01); *H01C 1/16* (2013.01)

(58) Field of Classification Search
CPC ........................................ G02F 1/29
See application file for complete search history.

(56) References Cited

U.S. PATENT DOCUMENTS

| 8,928,845 B2 | 1/2015 | Hashimoto |
| 9,360,840 B2 | 6/2016 | Won et al. |
| 9,720,246 B2 | 8/2017 | Won et al. |
| 2007/0279365 A1 | 12/2007 | Kageyama |

(Continued)

FOREIGN PATENT DOCUMENTS

| JP | 5-53089 A | 3/1993 |
| KR | 10-2014-0135561 A | 11/2014 |

(Continued)

OTHER PUBLICATIONS

Communication dated Apr. 20, 2020 issued by the European Intellectual Property Office in counterpart European Application No. 19200914.0.

*Primary Examiner* — Edmond C Lau
(74) *Attorney, Agent, or Firm* — Sughrue Mion, PLLC

(57) ABSTRACT

Provided are a light deflector and a light output device including the light deflector, the light deflector including a first electrode layer and a second electrode layer that are spaced apart from each other and facing each other, and a deflection layer configured to deflect incident light thereon based on a voltage applied to the first electrode layer and the second electrode layer, wherein the first electrode layer includes a plurality of electrode elements that are spaced apart from each other, and a resistor that is in contact with at least part of the plurality of electrode elements and in which a voltage drop is generated.

14 Claims, 13 Drawing Sheets

(56) References Cited

U.S. PATENT DOCUMENTS

| | | | |
|---|---|---|---|
| 2008/0212007 | A1 | 9/2008 | Meredith |
| 2011/0084963 | A1 | 4/2011 | Im |
| 2016/0131918 | A1 | 5/2016 | Chu et al. |
| 2017/0200423 | A1 | 7/2017 | Kim et al. |
| 2017/0322474 | A1* | 11/2017 | Ye .......................... G03B 29/00 |
| 2018/0113201 | A1* | 4/2018 | Toko ..................... G01S 7/4816 |
| 2018/0129105 | A1 | 5/2018 | Kim et al. |
| 2019/0147809 | A1 | 5/2019 | Kim et al. |

FOREIGN PATENT DOCUMENTS

| | | |
|---|---|---|
| KR | 10-2015-0086046 A | 7/2015 |
| KR | 10-2017-0084951 A | 7/2017 |
| KR | 10-2018-0052356 A | 5/2018 |
| KR | 10-1855258 B1 | 5/2018 |

\* cited by examiner

LIGHT DEFLECTOR AND LIGHT OUTPUT DEVICE INCLUDING THE SAME

CROSS-REFERENCE TO RELATED APPLICATION

This application claims priority from Korean Patent Application No. 10-2019-0021953, filed on Feb. 25, 2019, in the Korean Intellectual Property Office, the disclosure of which is incorporated herein in its entirety by reference.

BACKGROUND

1. Field

Example embodiments of the present disclosure relate to a light deflector and a light output device including the light deflector.

2. Description of the Related Art

Holographic display systems convert a general image signal into a holographic image signal and then provide a converted holographic image to both eyes by using an optical system, thereby enabling viewing of a 3D image. An optical system may be used to deflect the holographic image to both eyes.

Typical optical systems for deflecting light may include a micro-electro-mechanical systems (MEMS) scanner, a galvano mirror, a linear spatial light modulator, or a liquid crystal light deflector. In particular, the liquid crystal light deflector having a small volume may be applied to various light output devices.

SUMMARY

One or more example embodiments provide a light deflector and a light output device including the light deflector.

Additional aspects will be set forth in part in the description which follows and, in part, will be apparent from the description, or may be learned by practice of example embodiments.

According to an aspect of an example embodiment, there is provided a light deflector including a first electrode layer and a second electrode layer that are spaced apart from each other and facing each other, and a deflection layer configured to deflect incident light thereon based on a voltage applied to the first electrode layer and the second electrode layer, wherein the first electrode layer includes a plurality of electrode elements that are spaced apart from each other, and a resistor that is in contact with at least part of the plurality of electrode elements and in which a voltage drop is generated.

The resistor may include a material having electrical conductivity less than that of the plurality of electrode elements.

The resistor may include at least one of a conductive material, a semiconductor material, and an impurity-doped dielectric material.

An upper surface of the resistor may be in contact with lower surfaces of at least some of the plurality of electrode elements.

The resistor may include a first region that overlaps with the plurality of electrode elements and a second region that does not overlap with the plurality of electrode elements, with respect to an incident direction of the incident light.

The side surfaces of the resistor may be in contact with side surfaces of at least some of the plurality of electrode elements.

The resistor may include a plurality of resistance elements provided alternately with the plurality of electrode elements.

The plurality of electrode elements may include a first electrode element configured to receive a first voltage, a second electrode element configured to receive a second voltage that is different from the first voltage, and a third electrode element configured to receive a third voltage through the resistor, the third voltage being different from the first voltage and the second voltage, respectively.

The third electrode element may be provided between the first electrode element and the second electrode element.

The third voltage may be between the first voltage and the second voltage.

The light deflector may further include a drive circuit configured to apply the first voltage and the second voltage to the first electrode element and the second electrode element, respectively.

The drive circuit may include a first channel configured to output a reference signal of the light deflector, and a second channel configured to output a drive signal of the light deflector.

The drive circuit may include a first switching unit electrically connected to the first channel, the second channel, and the first electrode element, and configured to apply any one of the reference signal and the drive signal, as the first voltage, to the first electrode element, and a second switching unit electrically connected to the first channel, the second channel, and the second electrode element, and configured to apply any one of the reference signal and the drive signal, as the second voltage, to the second electrode element.

The first switching unit may include a first switching element electrically connecting the first channel to the first electrode element, and a second switching element electrically connecting the second channel to the first electrode element.

A pitch of the plurality of electrode elements may be 20 μm or less.

The deflection layer may include a plurality of liquid crystal molecules, and wherein an orientation of the plurality of liquid crystal molecules may vary based on the applied voltage.

According to another aspect of an example embodiment, there is provided a light output device including a light source configured to emit light, a deflection layer configured to deflect the light emitted by the light source based on an applied voltage, and a first electrode layer and a second electrode layer that are spaced apart from each other with the deflection layer therebetween, wherein the first electrode layer includes a plurality of electrode elements that are spaced apart from each other and a resistor that is in contact with at least some of the plurality of electrode elements and in which a voltage drop is generated.

The resistor may be in contact with lower surfaces of at least some of the plurality of electrode elements.

The resistor may include a first region that overlaps with the plurality of electrode elements and a second region that does not overlap with the plurality of electrode elements, with respect to an incident direction of the light emitted by the light source.

The resistor may be in contact with side surfaces of at least some of the plurality of electrode elements.

The resistor may include a plurality of resistance elements provided alternately with the plurality of electrode elements.

The plurality of electrode elements may include a first electrode element configured to receive a first voltage, a second electrode element configured to receive a second voltage that is different from the first voltage, and a third electrode element provided between the first electrode element and the second electrode element and configured to receive a third voltage through the resistor, the third voltage being different from the first voltage and the second voltage, respectively.

The third voltage may be between the first voltage and the second voltage.

The light output device may be one of a three-dimensional display device and a steering device.

According to another aspect of an example embodiment, there is provided a light deflector including a first electrode layer including a plurality of electrode elements that are spaced apart from each other, and a resistor that is in contact with at least a part of the plurality of electrode elements and is configured to generate a voltage drop, a second electrode layer, a deflection layer provided between the first electrode layer and the second electrode layer and configured to deflect incident light thereon based on a voltage output to the first electrode layer and the second electrode layer, a drive circuit including a plurality of channels that are connected to some of the plurality of electrode elements and configured to output voltages to the some of the plurality of electrode elements, a number of the plurality of channels being less than a number of the plurality of electrode elements.

The plurality of electrode elements may include a first electrode element connected to a first channel among the plurality of channels and configured to receive a first voltage through the first channel, a second electrode element connected to a second channel among the plurality of channels and configured to receive a second voltage that is different from the first voltage through the second channel, and a third electrode element provided between the first electrode element and the second electrode element and configured to receive a third voltage through the resistor based on the voltage drop generated by a difference between the first voltage and the second voltage, the third voltage being different from the first voltage and the second voltage, respectively

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

The example embodiments are described in detail with reference to the accompanying drawings. However, the present disclosure is not limited thereto and it will be understood that various changes in form and details may be made therein without departing from the spirit and scope of the following claims. That is, descriptions on particular structures or functions may be presented merely for explaining example embodiments.

In a layer structure, when a constituent element is disposed "above" or "on" another constituent element, the constituent element may be only directly on the other constituent element or above the other constituent elements in a non-contact manner.

While such terms as "first," "second," etc., may be used to describe various components, such components must not be limited to the above terms. The above terms are used only to distinguish one component from another.

The terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
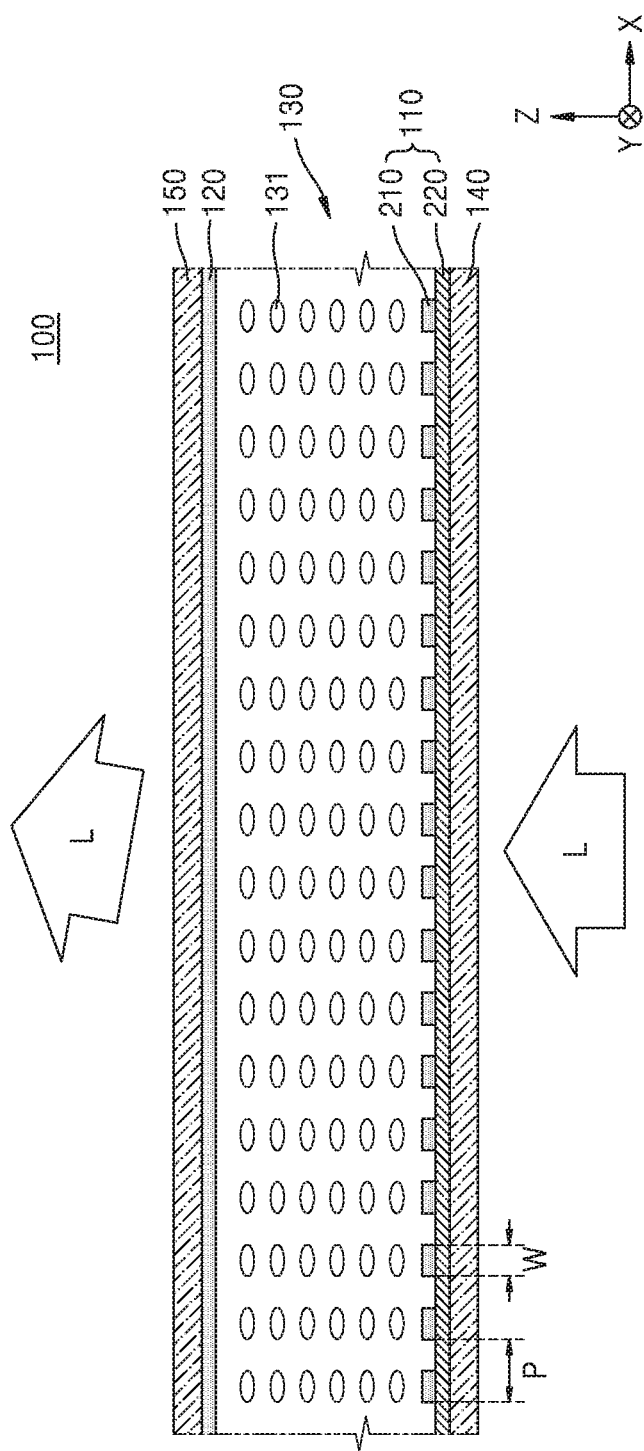
FIG. 1 is a cross-sectional view of a light deflector according to an example embodiment.

FIG. 1 is a cross-sectional view of a light deflector 100 according to an example embodiment. Referring to FIG. 1, the light deflector 100 may include a first electrode layer 110 and a second electrode layer 120 that are arranged spaced apart from each other and facing each other, and a deflection layer 130 for deflecting incident light based on a voltage applied to the first electrode layer 110 and the second electrode layer 120. Furthermore, the light deflector 100 may further include a first substrate 140 and a second substrate 150 respectively supporting the first electrode layer 110 and the second electrode layer 120.

The first electrode layer 110 may include a plurality of electrode elements 210 that are arranged spaced apart from each other and a resistor 220 in contact with the electrode elements 210. The electrode elements 210 may be formed in a blazed grating pattern. For example, the electrode elements 210 may be arranged spaced apart from each other and may each have a stripe shape. The electrode elements 210 may be arranged at a certain pitch P in a first direction, for example, the X-axis direction. For example, the pitch P of the electrode elements 210 may be about 20 μm or less. As the pitch P decreases, a diffraction angle or deflection angle of light of the light deflector 100 may increase. The electrode elements 210 may have the same width w. The width of the electrode elements 210 may be about 10 µm or less, but embodiments are not limited thereto. The electrode elements 210 may be formed to be longer in a second direction, for example, the Y-axis direction than as compared to the first direction.

The electrode elements 210 may include a transparent conductive material. For example, the electrode elements 210 may be formed of indium-tin-oxide (ITO), indium-zinc-oxide (IZO), or indium-tin-zinc-oxide (ITZO).

The resistor 220 may contact the electrode elements 210, and a voltage drop may be generated by the voltage applied to the electrode elements 210. The resistor 220 may have a flat panel shape in contact with a lower surface of the electrode elements 210. For example, the resistor 220 may be disposed between the first substrate 140 and the electrode elements 210. Accordingly, with respect to a direction in which incident light travels, a partial area of the resistor 220 may overlap with the electrode elements 210 and the remaining area of the resistor 220 may not overlap with the electrode elements 210.

The resistor 220 may include a material having electrical conductivity less than that of the electrode elements 210. Furthermore, the resistor 220 may be formed of a transparent material. The resistor 220 may include at least one of a conductive material, a semiconductor material, and a dielectric material doped with impurities. Accordingly, when a voltage is applied to the electrode elements 210, a voltage drop may be generated in the remaining area of the resistor 220 disposed between the neighboring electrode elements 210, and thus the voltage may be applied to the resistor 220.

The electrode elements 210 may include effective electrodes that receive a voltage from a drive circuit and dummy electrodes that receive a voltage from the resistor 220 and not from the drive circuit. The effective electrode and the dummy electrode are described later.

A voltage, for example, a reference voltage, for forming an electric field with the first electrode layer 110 may be applied to the second electrode layer 120. The second electrode layer 120 may have a flat panel shape facing the entire portion of the electrode elements 210, but embodiments are not limited thereto. The second electrode layer 120 may be implemented in a form like the electrode elements 210 of the first electrode layer 110. For example, the second electrode layer 120 may include electrode elements corresponding to the electrode elements 210 of the first electrode layer 110. In this state, the same reference voltage may be applied to all of the electrode elements of the second electrode layer 120.

The second electrode layer 120 may include a transparent conductive material, for example, ITO, IZO, or ITZO.

The deflection layer 130 may be disposed between the first electrode layer 110 and the second electrode layer 120. The deflection layer 130 may include a liquid crystal molecule 131 that changes an orientation based on an input voltage. The liquid crystal molecules 131 may be initially arranged such that a major radial direction thereof is parallel to one direction, for example, the X-axis direction.

The liquid crystal molecules 131 may be molecules having positive type dielectric anisotropy, but embodiments are not limited thereto. When a voltage is applied to each of the first electrode layer 110 and the second electrode layer 120, an electric field (E-field) may be formed in the deflection layer 130 between the first electrode layer 110 and the second electrode layer 120. The liquid crystal molecules 131 may be rotated in their orientation to be parallel to the E-field based on the intensity of E-field, that is, a voltage difference between the applied voltages. Phase modulation of the light incident through the first substrate 140 may be caused by using the above effect phase modulation. As the major radii of the liquid crystal molecules 131 are rotated in their orientation based on the E-field formed between the first electrode layer 110 and the second electrode layer 120, the light deflector 100 deflects light in a specific direction by forming an electric prism. Although the liquid crystal molecule 131 is described as a deflection element, the embodiments are not limited thereto. Any element other than the liquid crystal molecule 131, which is capable of deflecting light based on an applied electric signal, may be employed.

The first substrate 140 and second substrate 150 may include an insulating material and may be transparent. For example, at least one of the first substrates 140 and the second substrate 150 may be formed of glass or transparent plastic.

As a voltage corresponds to the width of each of the electrode elements 210, a quantization error may occur. An E-field distortion effect may occur in the deflection layer 130 corresponding to the interval between the electrode elements 210. To reduce the E-field distortion effect, it is necessary to reduce the pitch P of the electrode elements 210 or the interval between the electrode elements 210. However, even when the pitch of the electrode elements 210 or the interval between the electrode elements 210 is reduced in the light deflector 100, the number of channels of a drive circuit 300 (see FIG. 2) may be limited and less than the number of the electrode elements 210, and thus it may be difficult to apply a voltage to all of the electrode elements 210 of the light deflector 100. The restricted number of channels of the drive circuit 300 may make it difficult to reduce noise even when the light deflector 100 is integrated, and may increase the deflection angle.

In the light deflector 100 according to an example embodiment, as only some of the electrode elements 210 of the first electrode layer 110 receive a voltage from the drive circuit 300, and the remaining electrode elements 210 receive a voltage through the resistor 220, noise may be reduced by reducing a quantization error.

Figure 2:
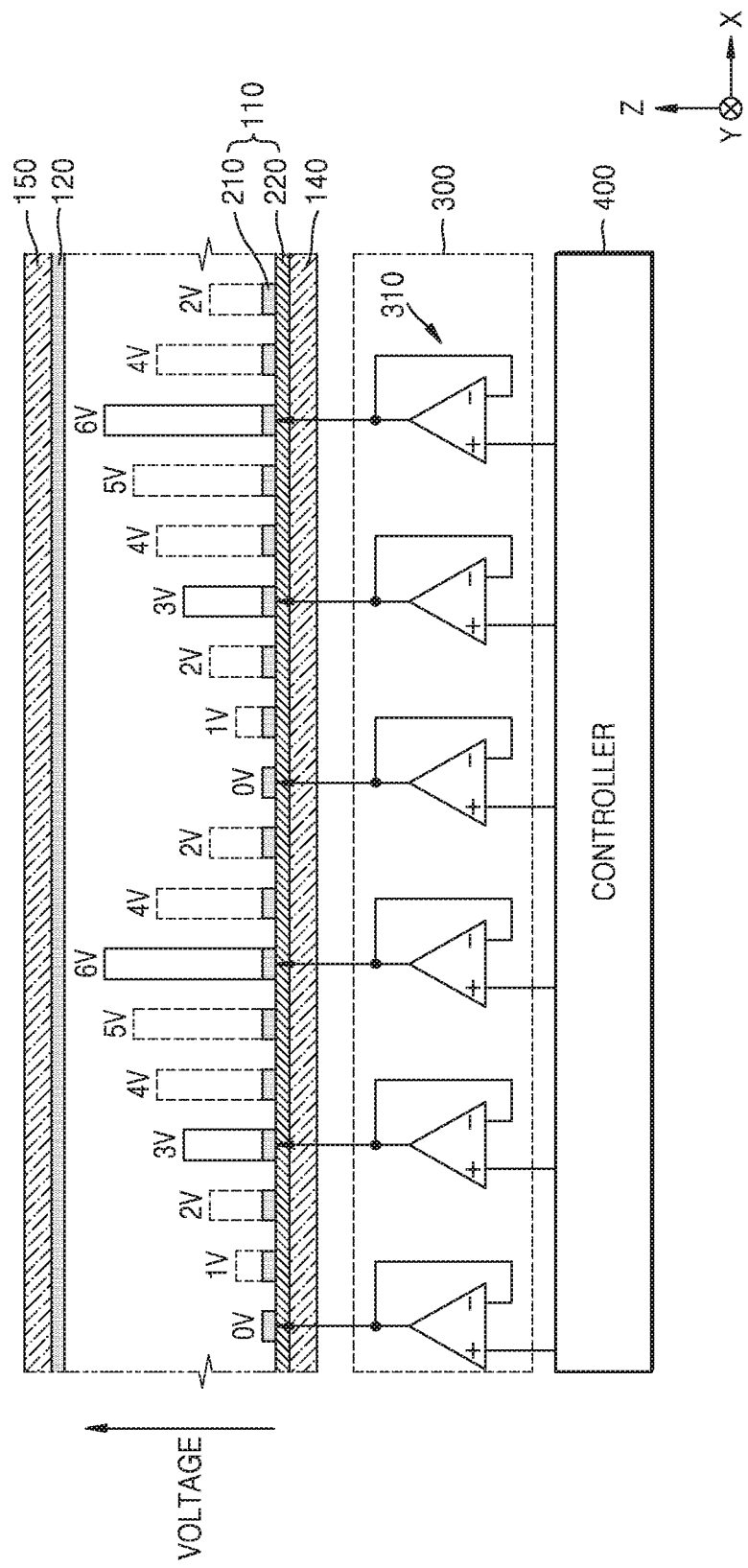
FIG. 2 is a reference view for describing a case of applying a voltage to some of a plurality of electrode elements of the light deflector of FIG. 1.

FIG. 2 is a reference view for describing an example of applying a voltage to some of the electrode elements 210 of the light deflector 100 of FIG. 1. As illustrated in FIG. 2, the drive circuit 300 may apply a voltage only to the electrode elements arranged at [3(k-1)+1]th positions, where k is a natural number, among the electrode elements 210. For example, the drive circuit 300 may apply a voltage to the first electrode layer 110, for example, a reference voltage, for example, 0 V, that is the same size as that applied to the second electrode layer 120 to the first electrode element 210, a voltage of 3 V to the fourth electrode element, and a voltage of 6 V to the seventh electrode elements 210. Then, in the deflection layer 130, an E-field corresponding to 3 V may be formed in a region where the fourth electrode element 210 and the second electrode layer 120 overlap with each other, and an E-field corresponding to 6 V may be formed in a region where the seventh electrode element 210 and the second electrode layer 120 overlap with each other. The electrode element 210 to which the voltage is directly applied by the drive circuit 300 may be an effective electrode.

Voltage drop occurs due to a voltage difference between 0 V and 3 V in the region of the resistor 220 disposed between the first electrode element 210 and the fourth electrode element 210, and thus current flows. A voltage of 1 V is applied to the second electrode element 210, and a voltage of 2 V is applied to the third electrode element 210. Accordingly, in the deflection layer 130, an E-field corresponding to 1 V may be formed in a region where the second electrode element 210 and the second electrode layer 120 overlap with each other, and an E-field corresponding to 2 V may be formed in a region where the third electrode element 210 and the second electrode layer 120 overlap with each other. The electrode element, such as the second electrode element and the third electrode element, receiving a voltage due to the voltage drop of the resistor 220 and not directly from the drive circuit 300 may be a dummy electrode. As an E-field is formed in a region where the dummy electrode and the second electrode layer 120 overlap with each other, an E-field distortion effect in the deflection layer 130 may be reduced.

Figure 3:
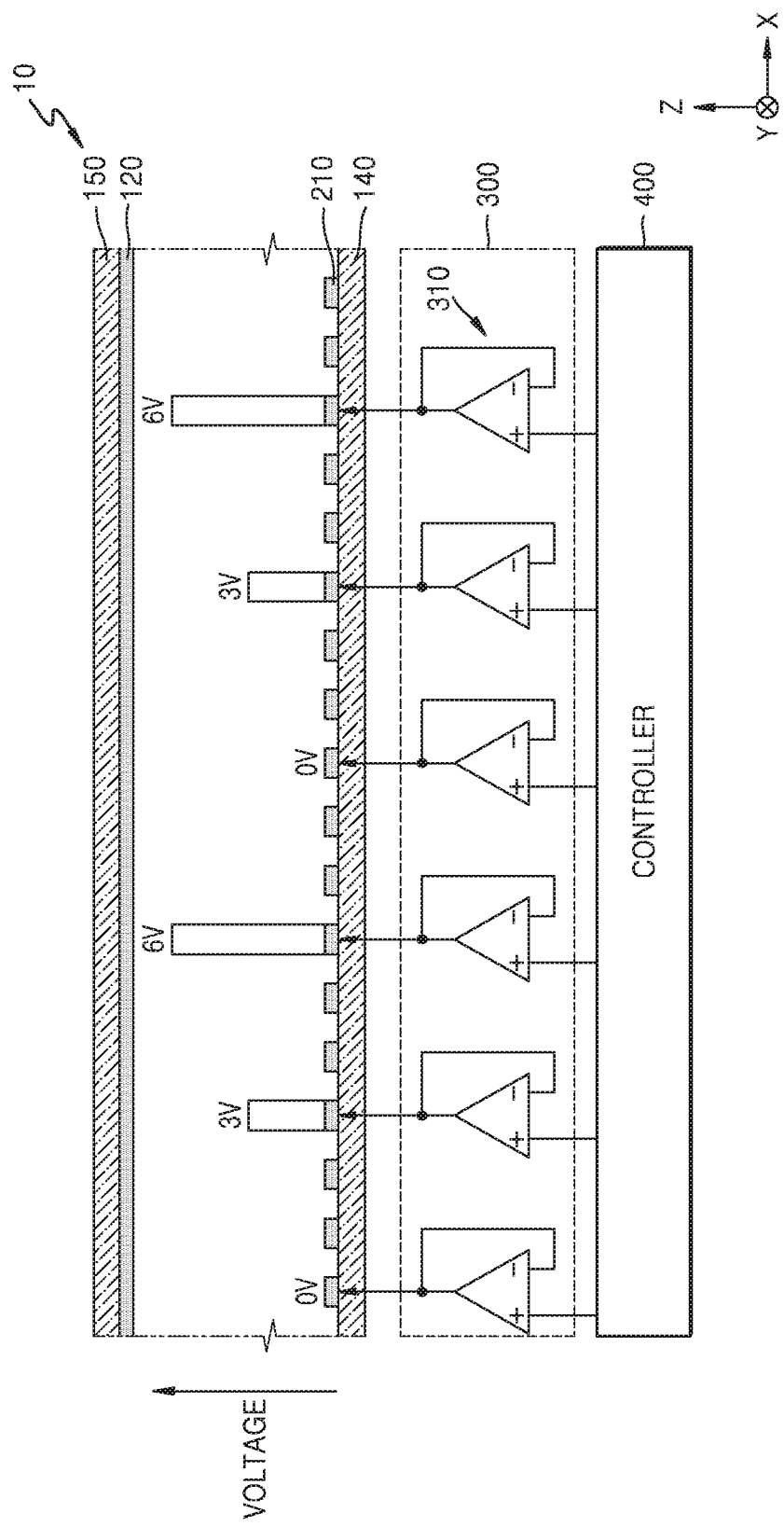
FIG. 3 is a reference view for describing an example of applying a voltage to a light deflector that does not include a resistor.

FIG. 3 is a reference view for describing an example of applying a voltage to a light deflector 10 that does not include a resistor. When comparing the light deflector 100 of FIG. 1 with the light deflector 10 of FIG. 3, the light deflector 10 of FIG. 3 may not include the resistor 220. The light deflector 10 of FIG. 3 may include the electrode elements 210 having a constant interval like the light deflector 100 of FIG. 1. To form the same E-field as the light deflector 10 of FIG. 3, a drive circuit having channels three times greater than the channels of the drive circuit 300 of FIG. 2 is used. However, separately manufacturing a drive circuit having a number of channels equal to the number of the electrode element of the light deflector 10 may be difficult.

When the drive circuit 300 of FIG. 2 is applied to the light deflector 10 of FIG. 3, in the deflection layer 130, an E-field may be formed only in a region that overlaps with the electrode elements 210 arranged at the [3(k−1)+1]th positions, where k is a natural number, whereas an E-field may not be formed or may be slightly formed in a region that overlaps with the electrode elements 210 arranged at the [3(k−1)+2]th positions, where k is a natural number, and the electrode elements 210 arranged at the 3k-th positions, where k is a natural number. Thus, the E-field distortion effect is generated in the deflection layer 130. As a result, distortion may be generated in a considerable portion of an ideal prism shape, and diffraction efficiency may be adversely affected.

As such, the light deflector 100 including the resistor 220 may reduce the E-field distortion effect by using the channels of the drive circuit 300 that is less than the number of the channels of the electrode elements 210. Furthermore, the resistor 220 may reduce the number of operating channels of the drive circuit 300.

Figure 4:
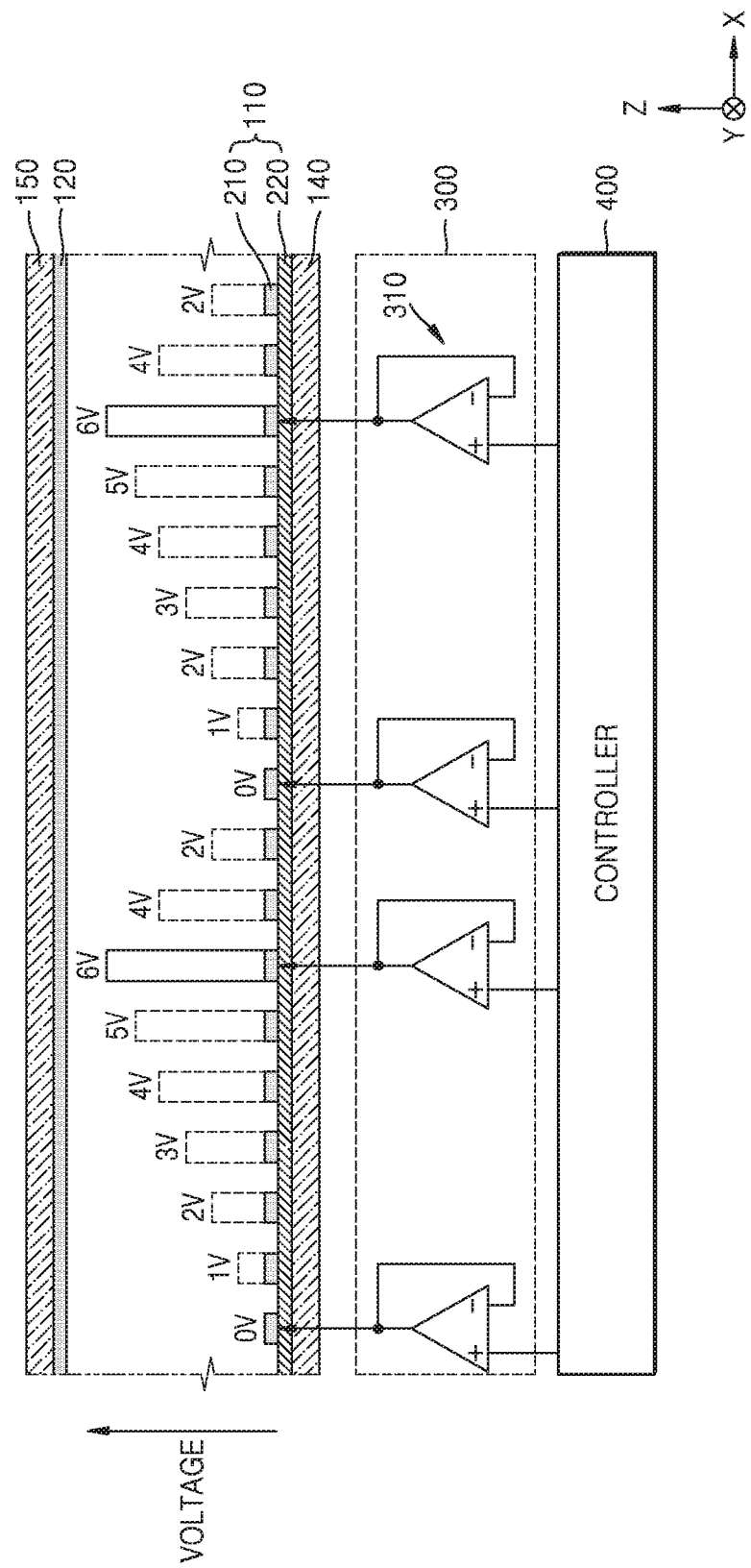
FIG. 4 is a reference view for describing an example of applying a voltage to some of a plurality of electrode elements of the light deflector of FIG. 1 according to an example embodiment.

FIG. 4 is a reference view for describing an example of applying a voltage to some of the electrode elements 210 of the light deflector 100 of FIG. 1 according to another example embodiment. The drive circuit 300 may apply a voltage, as illustrated in FIG. 4, only to a plurality of electrode elements arranged at the [9(k−1)+1]th positions, where k is a natural number, and a plurality of electrode elements arranged at the [9(k−1)+7]th positions, where k is a natural number, among the electrode elements 210. In this state, the electrode elements arranged at the [9(k−1)+1]th positions and the electrode elements arranged at the [9(k−1)+7]th positions may be referred to as the effective electrodes, and the remaining electrode elements may be referred to as the dummy electrodes. For example, as a drive circuit 300 may provide a reference voltage, for example, 0 V, to the electrode elements arranged at the [9(k−1)+1]th positions, and a drive voltage, for example, 6 V, to the electrode elements arranged at the [9(k−1)+7]th positions, voltages of 1 V, 2 V, 3 V, 4 V, and 5 V may be sequentially and respectively applied, due to the voltage drop of the resistor 220, to the electrode elements arranged at the [9(k−1)+2]th positions, the electrode elements arranged at the [9(k−1)+3]th positions, the electrode elements arranged at the [9(k−1)+4]th positions, the electrode elements arranged at the [9(k−1)+5]th positions, and the electrode elements arranged at the [9(k−1)+6]th positions. Accordingly, only the reference signal and the drive signal having one value are applied without segmenting the size of the drive signal, thereby reducing load of the drive circuit 300.

Figure 5:
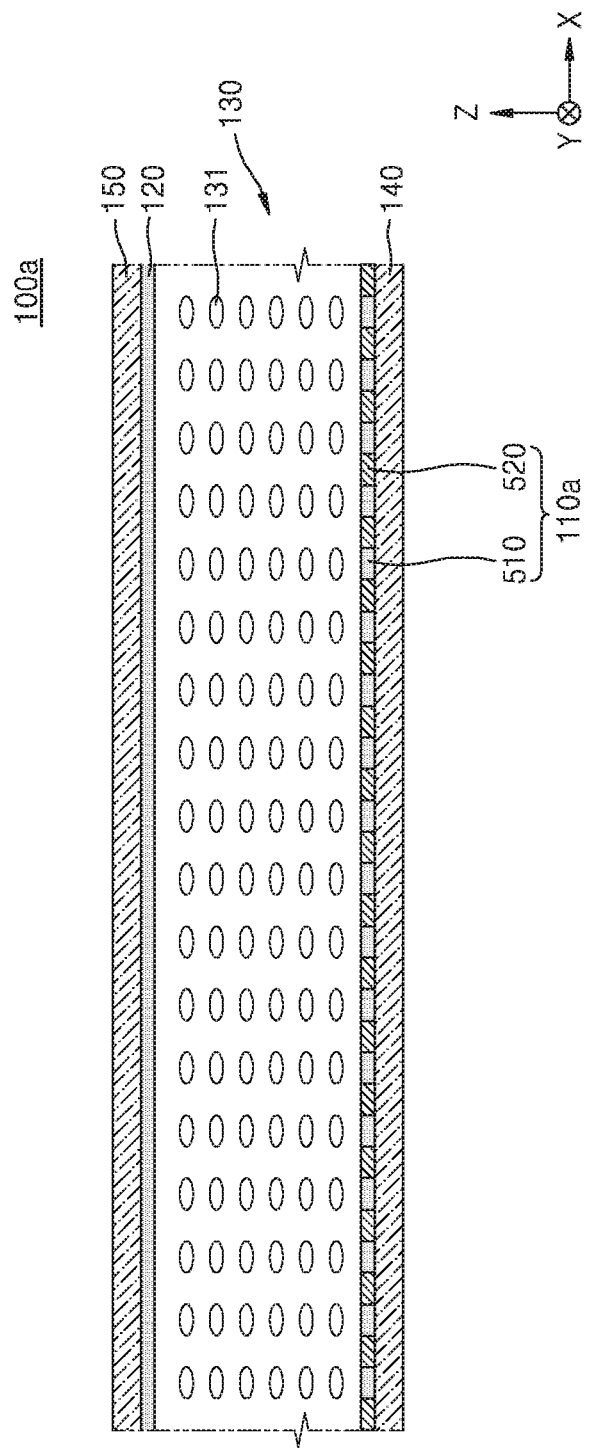
FIG. 5 is a cross-sectional view of a light deflector according to an example embodiment.

FIG. 5 is a cross-sectional view of a light deflector 100a according to another example embodiment. In the light deflector 100a of FIG. 5, a first electrode layer 110a of FIG. 5 may include a plurality of electrode elements 510 that are arranged spaced apart from each other and a plurality of resistance elements 520 that are arranged alternately with the electrode elements 510. A side surface of each of the resistance elements 520 may be in contact with a side surface of each of the electrode elements 510. Accordingly, each of the resistance elements 520 may drop the voltage of one of the electrode elements 510 contacting one side thereof and apply a dropped voltage to anther of the electrode elements 510 contacting the other side thereof.

Figure 6:
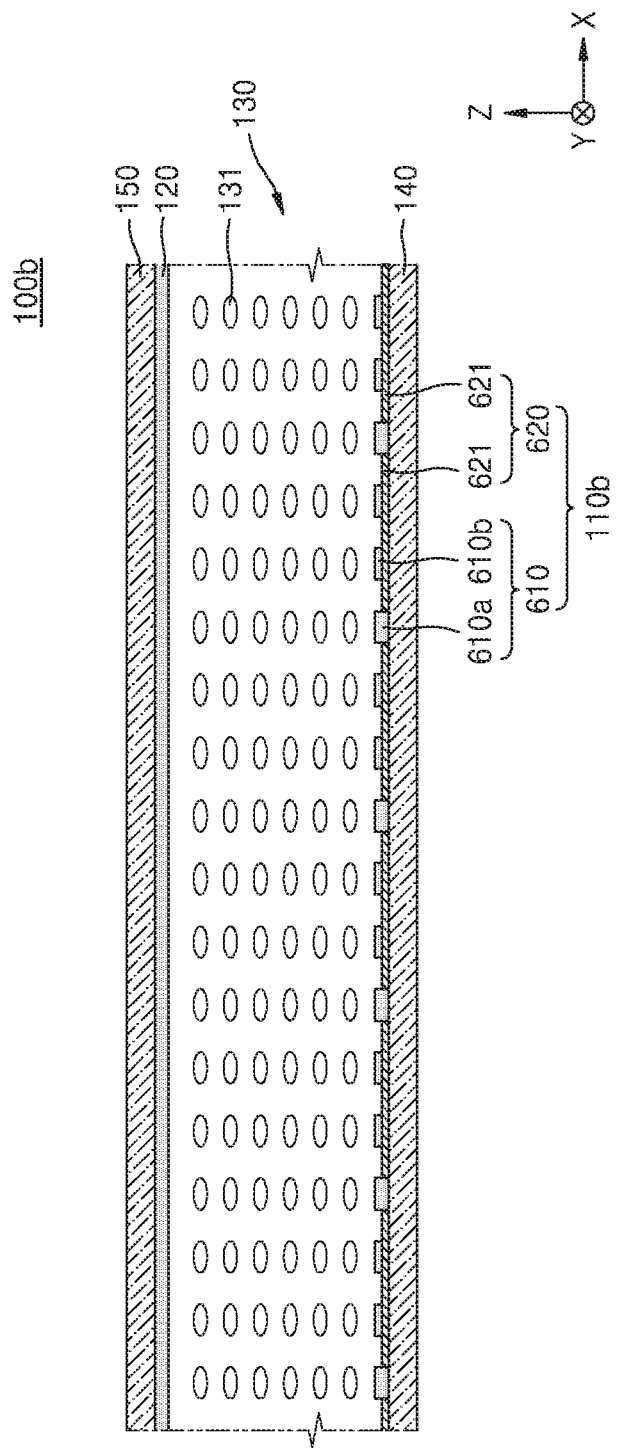
FIG. 6 is a cross-sectional view of a light deflector according to an example embodiment.

FIG. 6 is a cross-sectional view of a light deflector 100b according to another example embodiment. In the light deflector 100b of FIG. 6, a first electrode layer 110b of FIG. 6 may include a plurality of effective electrodes 610a that are arranged spaced apart from each other, a plurality of resistance elements 621 each being arranged between the neighboring effective electrodes 610a, and a plurality of dummy electrodes 610b that are arranged spaced apart from the effective electrodes 610a and in contact with the resistance elements 621. A side surface of each of the resistance elements 621 may be in contact with a side surface of the effective electrodes 610a. A lower surface of each of the dummy electrodes 610b may be in contact with an upper surface of each of the resistance elements 621. As one of the resistance elements 621 is in contact with only two of the effective electrodes 610a, signal interference between the other effective electrodes 610a may be reduced.

Although the drive circuit 300 for providing a voltage to the light deflectors 100, 100a, and 100b may include a channel through which a voltage to each of the electrode elements 210 that are electrically connected thereto is output, embodiments are not limited thereto. The drive circuit 300 may include a number of channels that is less than that of the effective electrodes. The channel may include an amplifier.

Figure 7:
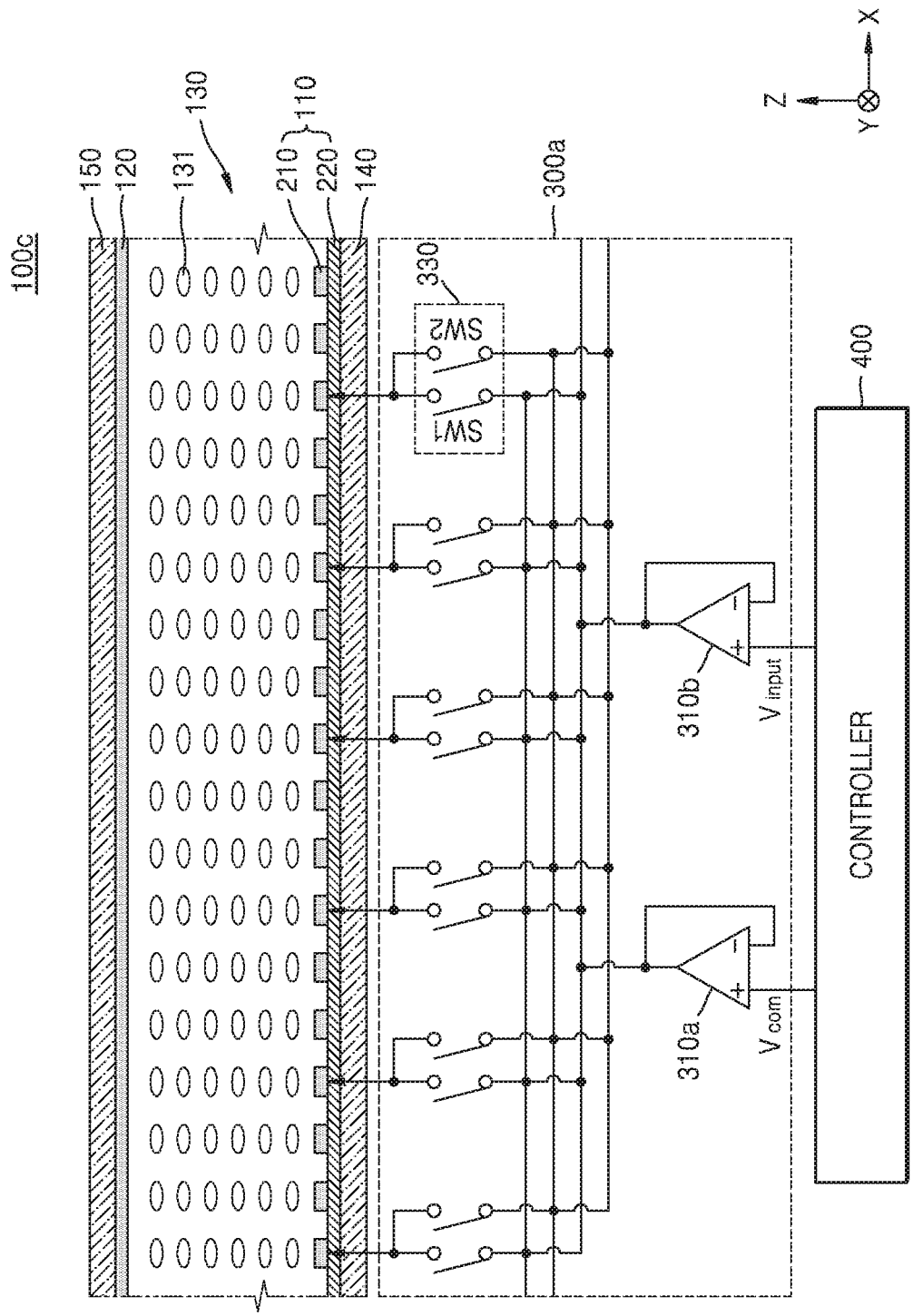
FIG. 7 illustrates a light deflector including a drive circuit according to an example embodiment.

FIG. 7 illustrates a light deflector 100c including a drive circuit 300a according to another example embodiment. As illustrated in FIG. 7, the drive circuit 300a may include a first channel 310a through which a reference signal is output, a second channel 310b through which a drive signal having a different size from that of the reference signal is output, and a plurality of switching units 330 electrically connecting the first channel 310a and the second channel 310b to the electrode elements 210. Each of the switching units 330 may include a first switching element SW1 electrically connecting the first channel 310a to one of the electrode elements 210 corresponding thereto and a second switching element SW2 electrically connecting the second channel 310b to one of the electrode elements 210 corresponding thereto.

The switching units 330 each may turn off at least one of the first switching element SW1 and the second switching element SW2 under the control of a controller 400. For example, each of the switching units 330 may turn the first switching element SW1 on and the second switching element SW2 off to transmit the reference signal to one of the electrode elements 210 corresponding thereto, may turn the first switching element SW1 off and the second switching element SW2 on to transmit the drive signal to one of the electrode elements 210 corresponding thereto. Furthermore, neither the reference signal nor the drive signal may be transmitted to the corresponding one of the electrode elements 210 by turning both of the first switching element SW1 and the second switching element SW2 off. Any of the electrode elements 210 corresponding to the switching units 330 in which both of the first switching element SW1 and the second switching element SW2 are turned off may become a dummy electrode. In other words, the effective electrode and the dummy electrode may vary based on the application of a voltage from the drive circuit 300.

Figure 8A:
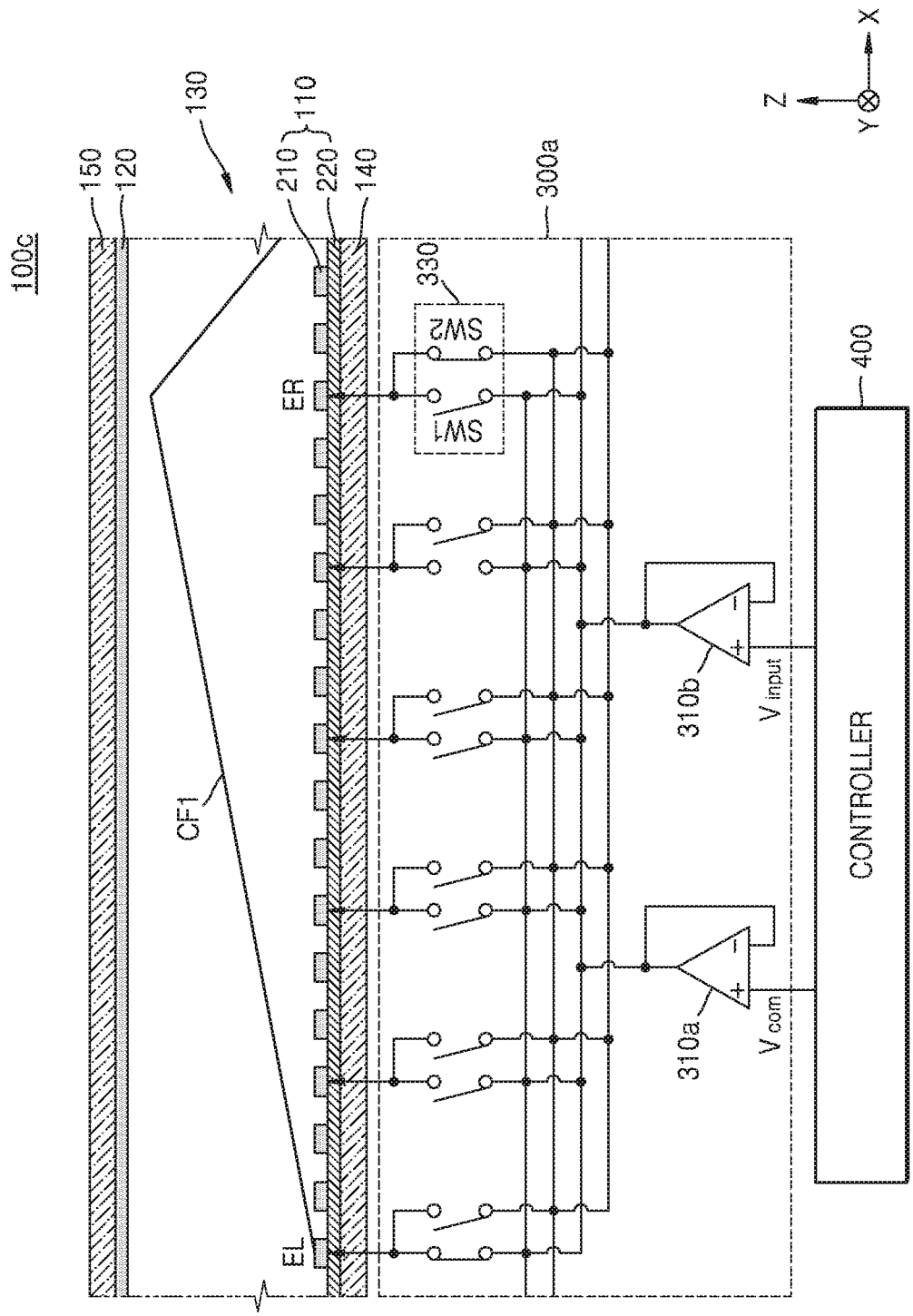
FIGS. 8A and 8B are reference views for describing an example of applying a voltage to the light deflector of FIG. 7.
Figure 8B:
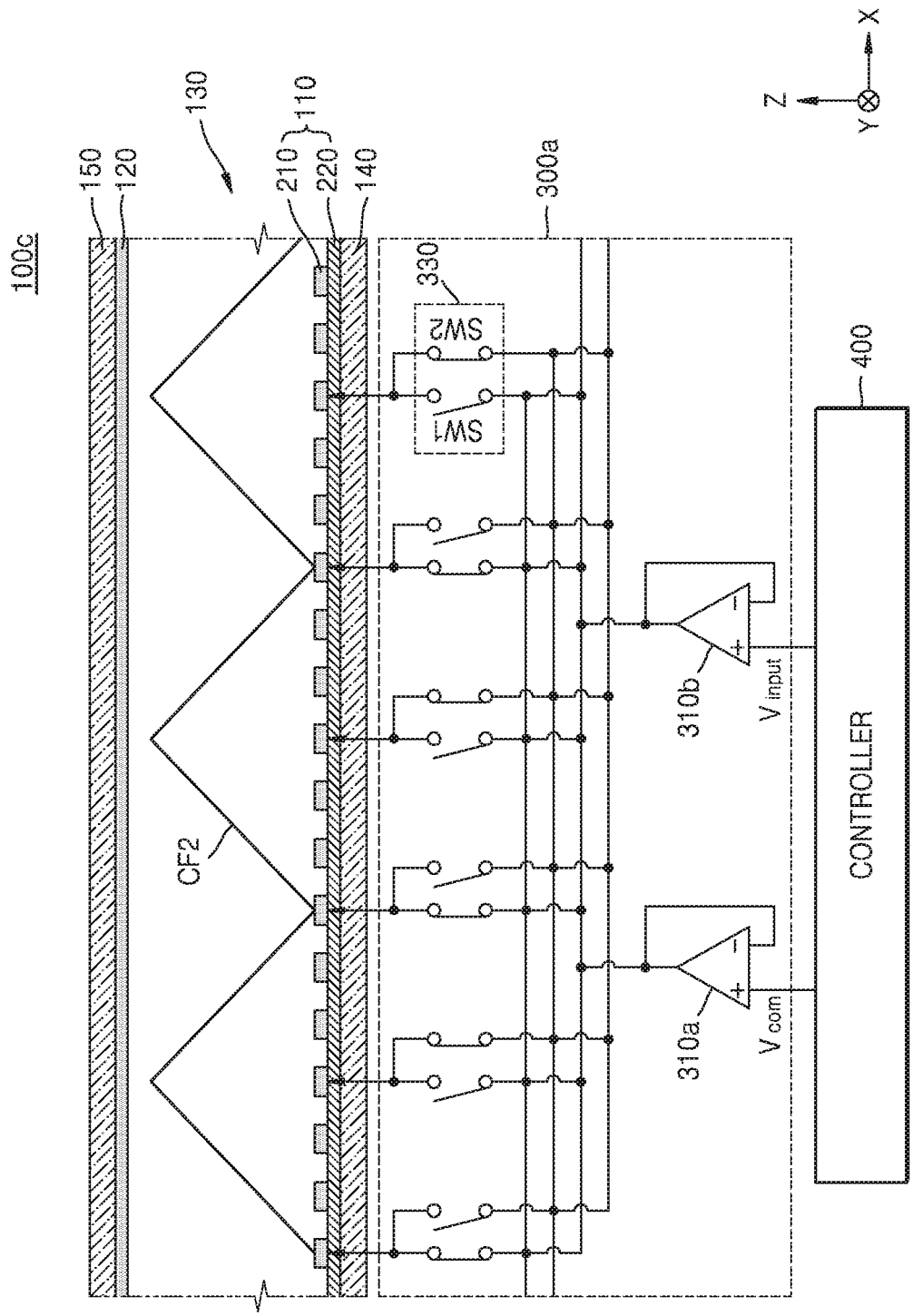

FIGS. 8A and 8B are reference views for describing examples of applying a voltage to the light deflector 100c of FIG. 7.

Among the electrode elements 210 connected to the drive circuit 300 of FIG. 8A, a reference signal $V_{COM}$ may be applied to an electrode element $E_R$ arranged at the rightmost side thereof and a drive signal $V_{INPUT}$ may be applied to an electrode element $E_L$ arranged at the leftmost side thereof. Then, an optical path change surface CF1 for deflecting incident light may be formed on the deflection layer 130. The optical path change surface CF1 may be formed by changing an orientation of liquid crystal molecules by the voltage applied between the first electrode layer 110 and the second electrode layer 120.

As illustrated in FIG. 8B, among a plurality of electrode elements connected to the drive circuit 300a, the reference signal $V_{COM}$ may be applied to the electrode elements 210 arranged at the odd-numbered positions, and the drive signal $V_{INPUT}$ may be applied to the electrode elements 210 arranged at the even-numbered positions. Then, an optical path change surface CF2 for deflecting incident light may be formed on the deflection layer 130. The optical path change surface CF2 illustrated in FIG. 8B may deflect the incident light greater than the optical path change surface CF1 illustrated in FIG. 8A.

Figure 9:
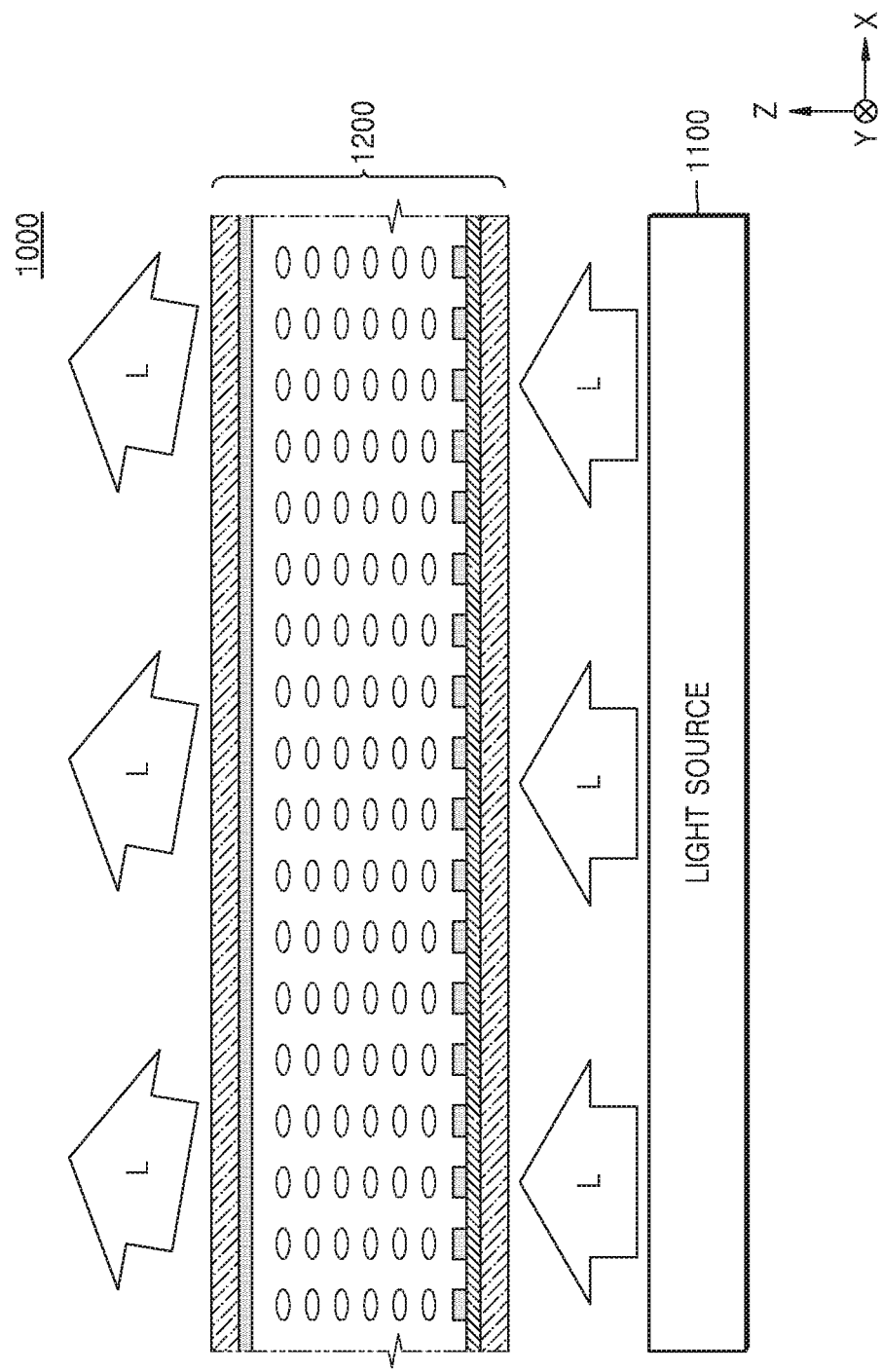
FIG. 9 illustrates a light output device according to an example embodiment.

The light deflector according to an example embodiment may be one of constituent elements of a light output device. FIG. 9 illustrates a light output device 1000 according to an example embodiment. As illustrated in FIG. 9, the light output device 1000 may include a light source 1100 for emitting light and a light deflector 1200 for deflecting the light emitted from the light source 1100. The light source 1100 may emit light corresponding to the purpose of the light output device 1000. For example, when the light output device 1000 is a holographic display device, the light source 1100 may be a light source that emits coherent light. When the light output device 1000 is a light steering device for detecting an external object, the light source 1100 may be a light source that emits light in an infrared range. The above-described light deflectors 100, 100a, 100b, and 100c may be used as the light deflector 1200.

Figure 10:
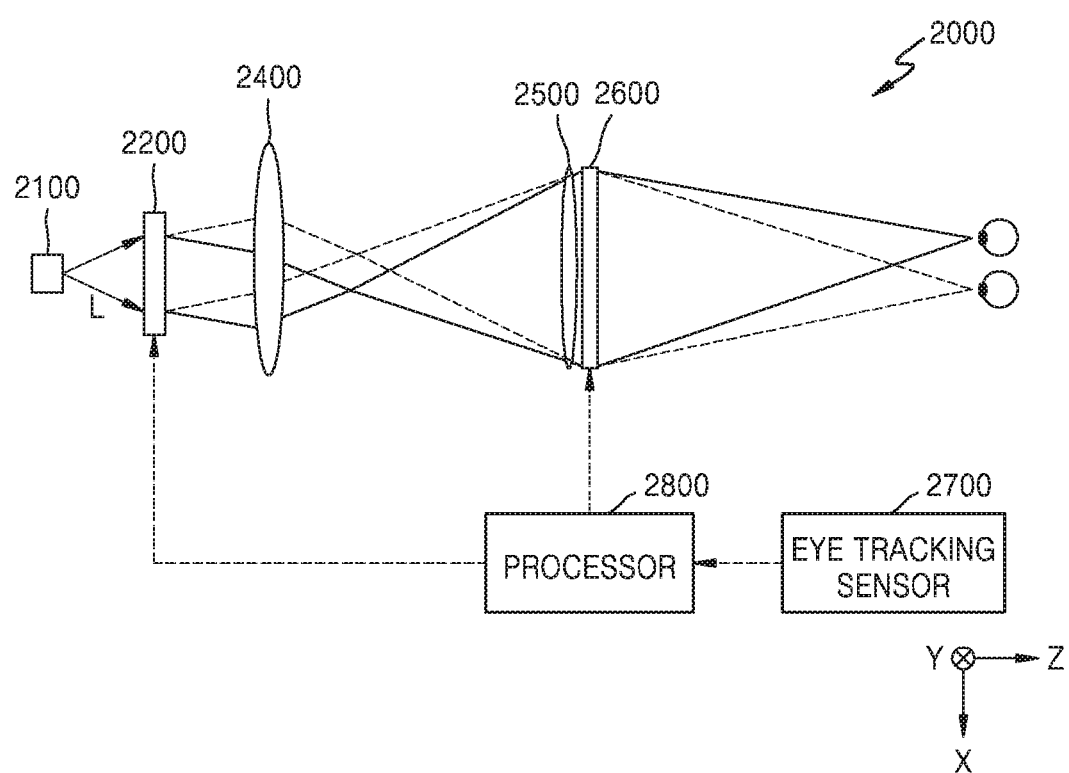
FIG. 10 is a cross-sectional view of a schematic structure of a holographic display device including a light deflector according to an example embodiment.

FIG. 10 is a cross-sectional view of a schematic structure of a holographic display device 2000 including a light deflector 2200 according to an example embodiment.

The holographic display device 2000 may include a light source 2100 for emitting coherent light, a light deflector 2200 for deflecting the light emitted from the light source 2100, and a spatial light modulator 2600 for forming a holographic image by diffracting the light.

The holographic display device 2000 may further include an f-θ lens 2400 that magnifies the light deflected by the light deflector 2200 to a size corresponding to a spatial light modulator 2600 and adjusts a focus trajectory according to a deflection direction to be a plane, and a field lens 2500 that focuses a hologram image formed by the spatial light modulator 2600 in a space. The arrangement order of the field lens 2500 and the spatial light modulator 2600 is not limited by the illustrated arrangement order and the arrangement positions may be switched with each other.

The holographic display device 2000 may further include an eye tracking sensor 2700 for tracking the locations of the left and right eyes of a viewer, and a processor 2800 for controlling a direction in which the light deflector 2200 deflects light and performing a computer generating hologram (CGH) calculation for a hologram pattern formed by the spatial light modulator 2600.

The above-described light deflectors 100, 100a, 100b, and 100c may be used as the light deflector 2200. The light emitted from the light source 2100 is deflected by the light deflector 2200 and is incident on the spatial light modulator 2600 via the f-θ lens 2400 and the field lens 2500. The spatial light modulator 2600 may form a hologram pattern having an interference fringe for modulating light. As the incident light is diffracted and modulated by the hologram pattern formed by the spatial light modulator 2600, a hologram image may be reproduced at a position in a space.

Figure 11:
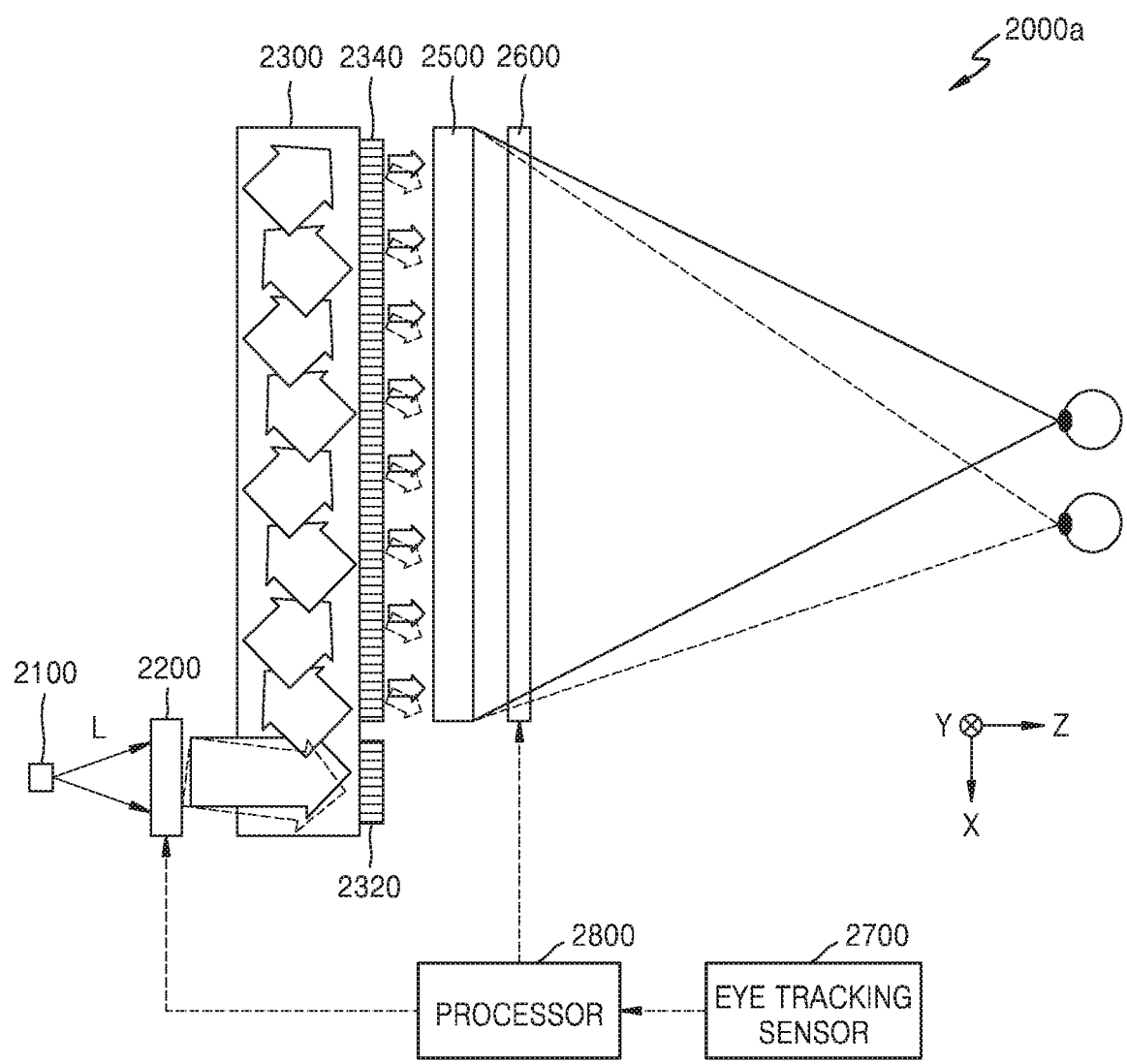
FIG. 11 illustrates a schematic structure of a holographic display device including a light deflector according to an example embodiment.

FIG. 11 illustrates a schematic structure of a holographic display device 2000a including the light deflector 2200 according to another example embodiment.

The holographic display device 2000a may include the light source 2100 for emitting coherent light, the light deflector 2200 for deflecting the light emitted from the light source 2100, and the spatial light modulator 2600 for forming a hologram image by diffracting the incident light. Furthermore, the holographic display device 2000b may further include a light guide unit 2300 for guiding the light emitted from the light source 2100 to travel toward the spatial light modulator 2600, and a field lens 2500 for focusing a hologram image in a space. The arrangement order of the field lens 2500 and the spatial light modulator 2600 may not be limited by the illustrated arrangement order and the arrangement positions may be switched with each other.

The holographic display device 2000a may further include the eye tracking sensor 2700 for tracking the left and right eyes of a viewer, and the processor 2800 for controlling a direction in which the light deflector 2200 deflects light and performing a CGH calculation for the hologram pattern formed by the spatial light modulator 2600.

The light deflector 2200 may deflect the light emitted from the light source 2100 to travel in a direction. The length in the Z-axis direction of the holographic display device 2000a of FIG. 11 may increase as a size difference between the light deflector 2200 and the spatial light modulator 2600 increases. As the holographic display device 2000a according to the example embodiment adopts the light guide unit 2300 that may enlarge the light deflected by the light deflector 2200 to fit to the size of the spatial light modulator 2600, the length in the Z-axis direction of the holographic display device 2000a may be reduced.

The light emitted from the light source 2100 may be deflected by the light deflector 2200, and then may be guided by the light guide unit 2300 to be enlarged to the size corresponding to that of the spatial light modulator 2600 and output in a direction toward the spatial light modulator 2600. The light guide unit 2300 may include an input coupler 2320 for allowing the light deflected by the light deflector 2200 to be incident and an output coupler 2340 for outputting the light traveling by being guided by the light guide unit 2300.

Directional light output through the light guide unit 2300 is incident on the spatial light modulator 2600 via the field lens 2500. The spatial light modulator 2600 forms a hologram pattern having an interference fringe to modulate the incident light. As the incident light is diffracted and modulated by the hologram pattern formed by the spatial light modulator 2600, a hologram image may be reproduced at a position in a space. A left eye hologram image may be reproduced at a left eye position, and a right eye hologram image may be reproduced at a right eye position.

The directional light output through the light deflector 2200 is incident on the spatial light modulator 2600 via the field lens 2500. The spatial light modulator 2600 forms a hologram pattern having an interference fringe to modulate the incident light. As the incident light is diffracted and modulated by the hologram pattern formed by the spatial light modulator 2600, a hologram image may be reproduced at a position in a space. A first light deflected in the first direction may be used as hologram light for the left eye, and a second light deflected in the second direction may be used as hologram light for the right eye.

The position of the light deflector 2200 in each of the holographic display devices 2000 and 2000a is not limited to those of FIGS. 10 and 11, and may be changed in various ways. For example, the light deflector 2200 may be located between the field lens 2500 and the spatial light modulator 2600, or the spatial light modulator 2600 may be located between the field lens 2500 and the light deflector 2200.

Figure 12:
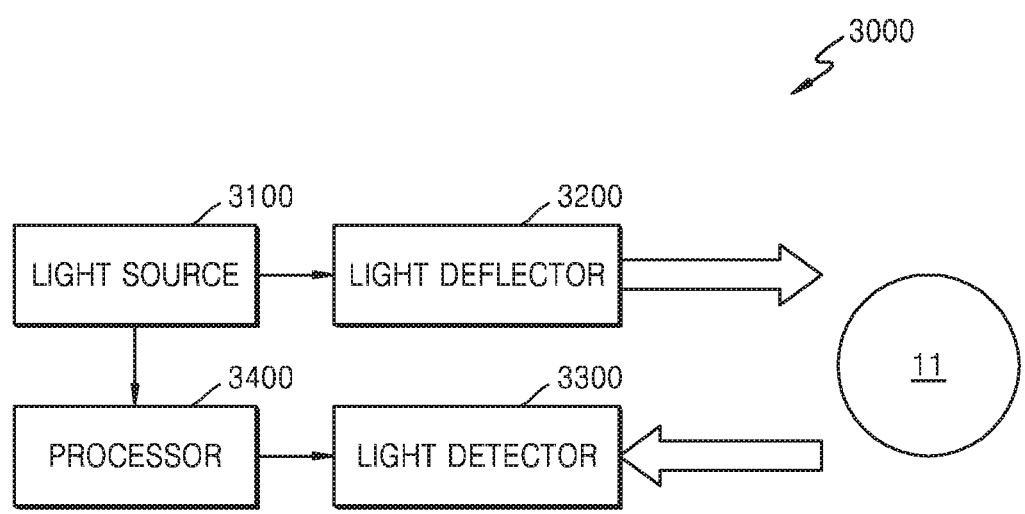
FIG. 12 is a block diagram of a light steering device including a light deflector according to an example embodiment.

FIG. 12 is a block diagram of a light steering device 3000 including a light deflector 3200 according to an example embodiment. The light steering device 3000 may include a light source 3100 for emitting light, the light deflector 3200 for deflecting the light emitted from the light source 3100 at a specific angle to output to an external environment, a light detector 3300 for detecting part of the light that is reflected or scattered by an object, and a processor 3400 that obtains information about the object existing in the external environment by using the detected light.

The light source 3100 may be a device for emitting light. For example, the light source 3100 may emit light in an infrared range. When the light in an infrared range is used, natural light in a visible range such as sunlight being mixed may be reduced or prevented. However, the light emitted from the light source 3100 is not limited to the light in the infrared range, and the light source 3100 may emit light in various wavelength ranges. In this case, correction to remove information of the mixed natural light may be necessary. The above-described light deflectors 100, 100a, 100b, and 100c may be used as the light deflector 3200. The light may be deflected by the light deflector 3200 to be radiated to the external environment.

The light detector 3300 may detect part of the light that is reflected or scattered by an object 11. The light detector 3300 may include one or more pixels. The pixel may be a light-receiving element that operates when a bias voltage is applied to the pixel. For example, the light detector 3300 may include an avalanche photo diode (APD) or a single photon avalanche diode (SPAD). The light detector 3200 may have a different circuit configuration such as analog front end (AFE) or time digital counter (TDC) based on which of the light-receiving element of APD or SPAD is included A distance from the object 11 may be calculated based on a light emission time of the light source 3100 and a light detection time of the light detector 3300.

The processor 3400 may obtain information about the object 11 by using the voltage applied by the light detector 3300. The processor 3400 may obtain information about the object 11 by detecting a peak of an electrical signal. The processor 3400 may determine the existence of the object 11 based on the detection of the peak. In addition, the processor 3400 may determine distance information from the object 11, that is, depth information of the object 11, by using a detection time of the detected peak and an output time of the light output from the light source 3100. As such, the light deflector 3200 may be applied to various light output devices.

It should be understood that embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A light deflector comprising:
a first electrode layer and a second electrode layer that are spaced apart from each other and facing each other; and
a deflection layer configured to deflect incident light thereon based on a voltage applied to the first electrode layer and the second electrode layer,
wherein the first electrode layer comprises a plurality of electrode elements that are spaced apart from each other, and a resistor that is in contact with at least part of the plurality of electrode elements and in which a voltage drop is generated,
wherein the plurality of electrode elements comprise:
a first electrode element configured to receive a first voltage;
a second electrode element configured to receive a second voltage that is different from the first voltage; and
a third electrode element configured to receive a third voltage through the resistor, the third voltage being different from the first voltage and the second voltage, respectively, and
wherein the light deflector further comprises a drive circuit configured to apply the first voltage and the second voltage to the first electrode element and the second electrode element, respectively.

2. The light deflector of claim 1, wherein the resistor comprises a material having electrical conductivity less than that of the plurality of electrode elements.

3. The light deflector of claim 1, wherein the resistor comprises at least one of a conductive material, a semiconductor material, and an impurity-doped dielectric material.

4. The light deflector of claim 1, wherein an upper surface of the resistor is in contact with lower surfaces of at least some of the plurality of electrode elements.

5. The light deflector of claim 1, wherein the resistor comprises a first region that overlaps with the plurality of electrode elements and a second region that does not overlap with the plurality of electrode elements, with respect to an incident direction of the incident light.

6. The light deflector of claim 4, wherein side surfaces of the resistor is in contact with side surfaces of at least some of the plurality of electrode elements.

7. The light deflector of claim 1, wherein the resistor comprises a plurality of resistance elements provided alternately with the plurality of electrode elements.

8. The light deflector of claim 1, wherein the third electrode element is provided between the first electrode element and the second electrode element.

9. The light deflector of claim 1, wherein the third voltage is between the first voltage and the second voltage.

10. The light deflector of claim 1, wherein the drive circuit comprises:
   a first channel configured to output a reference signal of the light deflector; and
   a second channel configured to output a drive signal of the light deflector.

11. The light deflector of claim 10, wherein the drive circuit comprises:
   a first switching unit electrically connected to the first channel, the second channel, and the first electrode element, and configured to apply any one of the reference signal and the drive signal, as the first voltage, to the first electrode element; and
   a second switching unit electrically connected to the first channel, the second channel, and the second electrode element, and configured to apply any one of the reference signal and the drive signal, as the second voltage, to the second electrode element.

12. The light deflector of claim 11, wherein the first switching unit comprises:
   a first switching element electrically connecting the first channel to the first electrode element; and
   a second switching element electrically connecting the second channel to the first electrode element.

13. The light deflector of claim 1, wherein a pitch of the plurality of electrode elements is 20 μm or less.

14. The light deflector of claim 1, wherein the deflection layer comprises a plurality of liquid crystal molecules, and
   wherein an orientation of the plurality of liquid crystal molecules vary based on the applied voltage.

* * * * *